Figure 3:
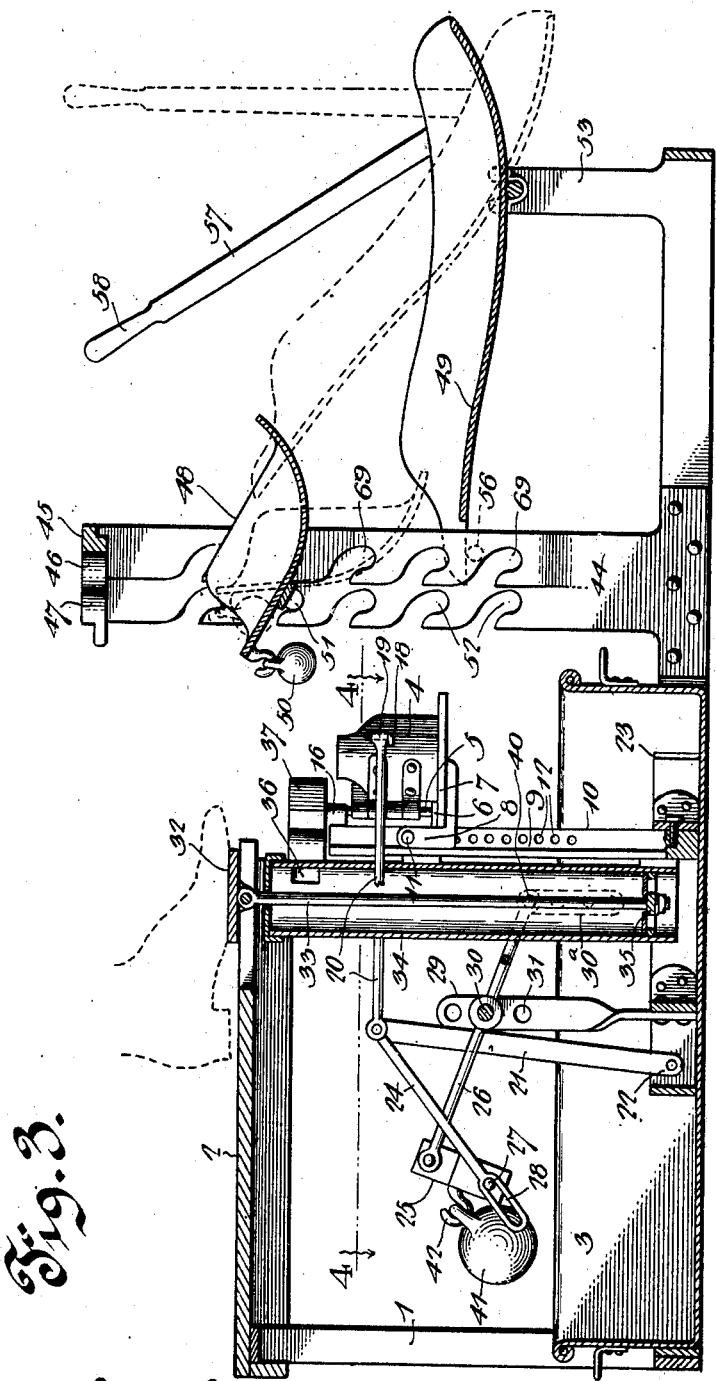

No. 660,697. Patented Oct. 30, 1900.
J. J. BURKHARDT.
GLASS WORKING MACHINE.
(Application filed May 19, 1900.)
(No Model.) 3 Sheets—Sheet 1.
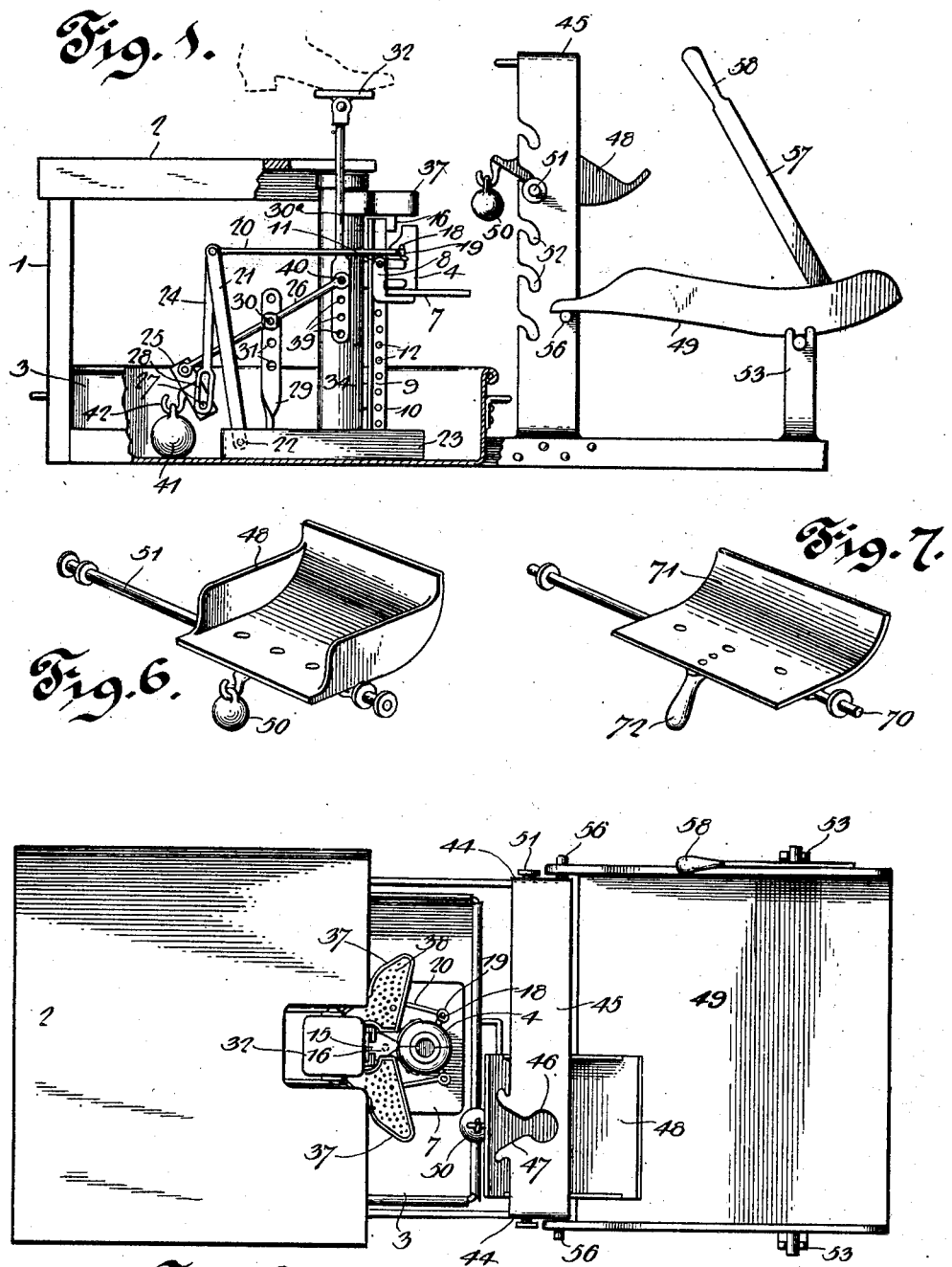
Witnesses
J. Fauflenbverwell.
H. J. Riley
J. Jakob Burkhardt, Inventor.
by C. A. Snow & Co.
Attorneys
THE NORRIS PETERS CO., PHOTO-LITHO., WASHINGTON, D. C.

No. 660,697. Patented Oct. 30, 1900.
J. J. BURKHARDT.
GLASS WORKING MACHINE.
(Application filed May 19, 1900.)

(No Model.) 3 Sheets—Sheet 2.

Witnesses J. Jakob Burkhardt, Inventor.
by C. A. Snow & Co.
Attorneys

No. 660,697. Patented Oct. 30, 1900.
J. J. BURKHARDT.
GLASS WORKING MACHINE.
(Application filed May 19, 1900.)
(No Model.) 3 Sheets—Sheet 3.
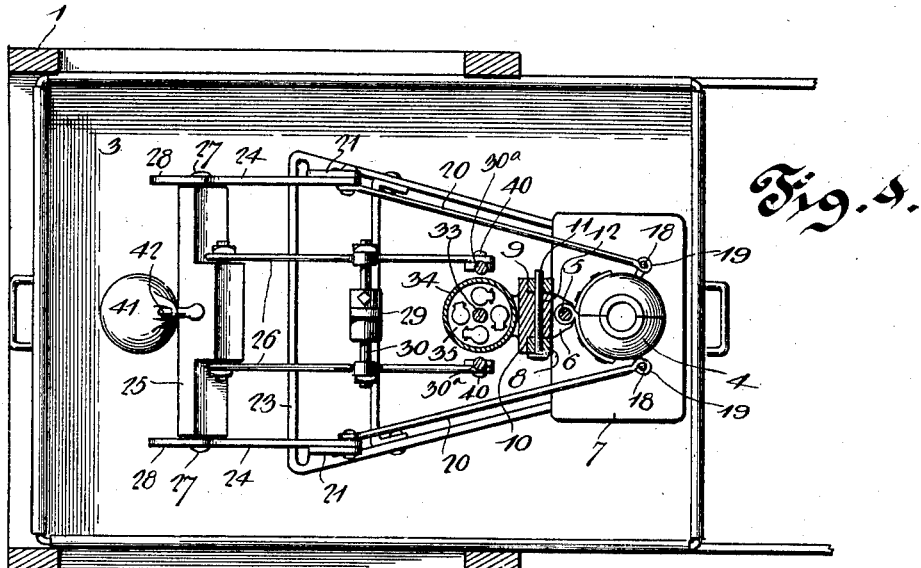
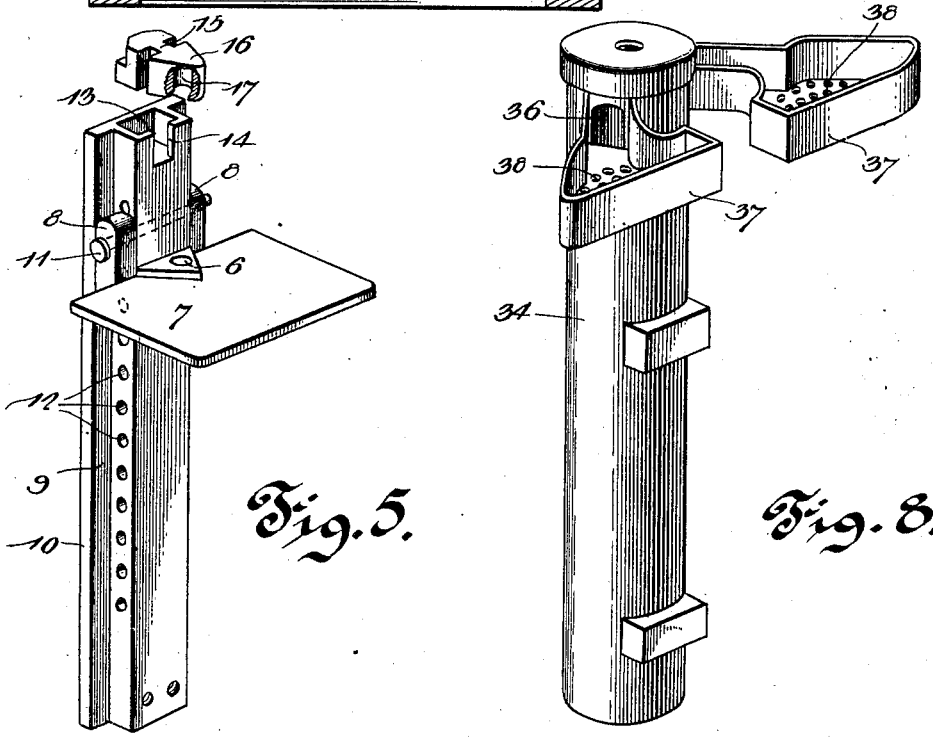
Witnesses  J. Jakob Burkhardt, Inventor.
by C. A. Snow & Co.
Attorneys

UNITED STATES PATENT OFFICE.

JOHN JAKOB BURKHARDT, OF TIFFIN, OHIO.

GLASS-WORKING MACHINE.

SPECIFICATION forming part of Letters Patent No. 660,697, dated October 30, 1900.

Application filed May 19, 1900. Serial No. 17,284. (No model.)

*To all whom it may concern:*

Be it known that I, JOHN JAKOB BURKHARDT, a citizen of the United States, residing at Tiffin, in the county of Seneca and State of Ohio, have invented a new and useful Glass-Working Machine, of which the following is a specification.

The invention relates to improvements in glass-working machines.

One object of the present invention is to improve the construction of machines for working glass and to provide a simple and comparatively inexpensive one capable of enabling a mold to be opened and closed by the operator and adapted after the glass is removed from the mold and by the same operation to discharge a quantity of water upon the mold for the purpose of cooling the same.

Another object of the invention is to collect the water after it has been discharged upon the mold and to enable it to be reused, thereby reducing the consumption of water to a minimum and preventing the same from escaping.

Another object of the invention is to enable the articles to be readily removed from the blow-tube and to collect the same and enable them to be readily discharged into a suitable receptacle.

Furthermore, the invention has for its object to provide a machine which will be adapted to be readily adjusted for operating molds of different sizes.

The invention consists in the construction and novel combination and arrangement of parts hereinafter fully described, illustrated in the accompanying drawings, and pointed out in the claims hereto appended.

In the drawings, Figure 1 is a side elevation, partly in section, of a machine constructed in accordance with this invention. Fig. 2 is a plan view of the same. Fig. 3 is a longitudinal sectional view. Fig. 4 is a horizontal sectional view on line 4 4 of Fig. 3. Fig. 5 is a detail perspective view illustrating the manner of supporting the mold. Figs. 6 and 7 are detail views of pivoted cradles. Fig. 8 is a detail perspective view of the pump-barrel and its diverging troughs.

Like numerals of reference designate corresponding parts in all the figures of the drawings.

1 designates a supporting-frame provided with a platform 2, upon which the operator stands, and located beneath the platform is a tank 3, adapted to contain water for cooling a mold 4. The mold 4, which is of the usual construction, is composed of two hinged sections connected at the back by a vertical pintle 5, which passes through eyes of the sections of the mold and which has its lower end journaled in a suitable bearing 6 of an adjustable support 7. The support 7 consists of a horizontal shelf and a pair of upwardly-extending arms 8, located in vertical grooves or recesses 9 of a vertical standard 10 and adjustably secured to the same by means of a transverse pin 11, passing through perforations of the upper ends of the arms 8 and adapted to be arranged in any one of a series of perforations 12, formed in the central portion of the standard or upright 10. The standard or upright 10 is provided at its top with a recess 13, and it has a slot or opening 14 at its front, communicating with the recess and adapted to receive a neck 15 of a bearing-block 16, which is grooved at opposite sides to form the neck 15. The inner portion of the bearing-block fits in the recess of the upright or standard, and the projecting front or outer portion is provided at its lower face with a socket 17 for the reception of the upper end of the pintle of the mold 4. By adjusting the support 7 vertically the machine may be arranged to receive a mold of any size.

The sides of the mold are provided at their outer faces in advance of the pintle with pivots 18, detachably engaging eyes 19 of connecting-rods 20, which are pivoted at their inner or rear ends to a pair of levers 21, and the latter are fulcrumed at their lower ends 22 on a bottom frame 23 and are adapted to oscillate backward and forward from the position shown in Fig. 1 to that illustrated in Fig. 3. The upper ends of the supporting-levers 21 are connected by links 24 with a transverse bar or piece 25, which is also connected with the rear ends of a pair of oscillating levers 26. The ends of the transverse bar or piece 25 are provided with projecting pivots 27, which extend through slots 28 of the lower ends of the links 24, as clearly shown in Fig. 3 of the accompanying drawings. The levers 26, which are fulcrumed between their ends on a standard or support 29, are disposed approximately horizontally when they are near the center of their movement, and their arms are adapted to swing upward and downward. They are provided between their ends with eyes for the reception of a pivot 30, which is adapted to be arranged in any one of a series of perforations 31 of the support 29, and the front ends of the levers 26 are connected by rods or bars 30$^a$ with a treadle or plate 32, secured to the upper end of a vertical movable rod or plunger 33. The rod or plunger 33 is arranged within a cylinder or tube 34 and it carries a valved plunger-head 35 and is adapted on the upstroke to elevate a quantity of water which is discharged through an opening 36 at the upper portion of the cylinder or barrel 34. The cylinder or barrel and the plunger constitute a pump, and the openings 36 communicate with a pair of diverging troughs 37, extending outward and located over the sections of the mold when the latter is open and provided with perforations 38, through which the water is discharged and caused to flow over the sections of the mold to cool the same. The lower ends of the connecting rods or bars, which extend from the foot-plate or treadle to the front ends of the oscillating levers 26, are provided with perforations 39, arranged at intervals and adapted to receive pivots 40 to vary the connection between the levers and the plunger of the pumping device to regulate the quantity of water and the depth of the plunger in the tank 3. When the treadle or foot-plate is depressed by the foot of the operator, the plunger is forced downward to the position shown in Fig. 3, and the levers 26 are oscillated to swing the transverse connecting bar or piece upward, and motion is communicated through the slotted links to the oscillating levers 21, which spring forward and close the sections of the mold. As soon as the operator removes his foot from the treadle or foot-plate the levers 26 are swung in the opposite direction by means of a weight 41, secured to the transverse connecting bar or piece 25, near the center thereof, preferably by means of a hook 42, as illustrated in Fig. 3; but any other suitable means may be employed for weighting the transverse connecting-piece 25. This reverse movement of the levers 26 swings the levers 21 rearward and opens the sections of the mold, and the upward movement of the plunger carries a quantity of water upward and causes the same to be discharged over the sections of the mold. The supporting-frame, which is arranged at the bottom of the tank, may be of any suitable construction, and the upright or standard 10 and the support 29 are suitably secured to the same, and the pump cylinder or barrel is preferably mounted on the upright or standard 10.

The supporting-frame 1, which forms the framework of the machine, is provided in advance of the platform with standards or uprights 44, located at opposite sides of the main frame and connected at their upper ends by a horizontal top piece 45, which is provided with an opening 46, having a flaring mouth 47 and adapted to receive the lower end of the blow pipe or tube and the glass to enable the article to be readily broken off. The article after it has been broken off from the pipe or tube of the operator falls into a pivoted cradle 48, mounted between the standards or uprights 44. The molded article is broken off from the tube by drawing the latter upward through the opening 46, and when the molded article falls into the pivoted cradle 48 it overbalances the same and automatically dumps itself into a tray 49. The cradle 48, which is provided with a curved bottom, has sides and is pivoted near its rear end, the front portion of the cradle being counterbalanced by a weight 50 to hold it in position to receive the molded article. The molded article rolls down the inclined bottom, and as it reaches the front portion of the pivoted cradle the latter swings downward, and the article is deposited in the tray 49 without danger of breaking it. The cradle is provided with a pivot-rod 51, which is adapted to be arranged in any one of a series of open bearings 52 to arrange it the proper distance from the opening 46 to suit the size of the article to be discharged into the tray. The tray is pivotally mounted in advance of its center on suitable posts or supports 53, and its rear end is supported by horizontal projections or pins 56, extending from the outer faces of the standards 44 and arranged to receive the sides of the tray, which are extended beyond the rear edge of the bottom, as clearly illustrated in Fig. 3 of the accompanying drawings. The tray is provided with an inclined arm 57, terminating at its upper end in a grip or handle 58 and adapted to be readily grasped to tilt the tray for discharging the contents thereof into a wagon or other vehicle for collecting the articles. The standards or uprights 44 are also provided with open bearings 69, adapted to receive a pintle-rod 70 of a cradle 71, designed to be substituted for the cradle 48 and adapted to receive large articles. The open bearings 69 permit the cradle 71 to be adjusted vertically and arranged at different elevations on the standards or uprights 44, and the said cradle 71 is provided at its back with a grip or handle 72 to enable it to be operated by hand.

It will be seen that the machine is simple and comparatively inexpensive in construction, that it is capable of enabling a mold to be opened and closed and a quantity of water discharged upon the sections thereof by the foot of the operator, and that the molded article may be readily removed from the pipe and automatically delivered into a receptacle which may be readily dumped to discharge its contents into a vehicle. It will also be apparent that the machine is adapted to operate molds of various sizes and that it may be readily adjusted to receive the same, and that it will enable a glass-blower to operate more rapidly, maintain the molds in proper condition, and deliver the completed article to the tray without the aid of mold boys.

What is claimed is—

1. In a machine of the class described, the combination of a tank, a mold composed of sections, a pumping device extending upward from the tank and arranged to discharge water upon the sections of the mold, and means for operating the mold and the pumping device for opening and closing the former and for discharging a quantity of water upon the sections thereof, substantially as described.

2. In a machine of the class described, the combination of a mold composed of sections, a pumping device arranged to discharge a quantity of water upon the sections of the mold, and provided with a vertically-movable plunger, a foot-plate or treadle connected with the plunger and adapted to move the same in one direction when depressed by the foot of the operator, a weight for reciprocating the plunger in the opposite direction, and means for connecting the sections of the mold with the plunger, substantially as described.

3. In a machine of the class described, the combination of a mold having sections, a pumping device provided with a cylinder or barrel and having troughs extending from its upper portion and provided with perforated bottoms and adapted to discharge water upon the sections of the mold, and operating mechanism connected with the pumping device and with the mold to open and close the latter and to discharge a quantity of water on the same, substantially as described.

4. In a machine of the class described, the combination of a tank, a pumping device extending upward therefrom and arranged to discharge a quantity of water at its top, said tank extending beyond the pumping device and adapted to receive the discharged water to enable the latter to be continuously used, a mold composed of sections and arranged to have the water discharged upon it, and means for operating the pumping device and for opening and closing the mold, substantially as described.

5. In a machine of the class described, the combination of a pumping device having a reciprocating plunger, a treadle connected with the upper end of the plunger and arranged to be depressed by the foot of the operator, a mold composed of sections and arranged to receive the water from the pumping device, a lever 26 fulcrumed between its ends and connected at one end with the plunger of the pumping device, oscillating levers 21 connected with the lever 26, and means for connecting the sections of the mold with the oscillating levers, substantially as described.

6. In a machine of the class described, the combination of a pumping device provided with a vertically-reciprocating plunger, a depressible treadle or plate connected with the plunger, a mold composed of sections, an oscillating lever connected with the sections of the mold and adapted to open and close the same, and connections between the plunger and the oscillating lever, substantially as described.

7. In a machine of the class described, the combination of a pumping device having a plunger, a mold composed of sections and arranged to receive water from the pumping device, an oscillating lever connected with and adapted to open and close the sections of the mold, slotted links extending inward or rearward from the oscillating lever, a weighted transverse bar engaging the slots of the links, and a lever fulcrumed between its ends and connected with the transverse bar and with the plunger of the pumping device, substantially as described.

8. In a machine of the class described, the combination of a pumping device, a mold composed of sections, oscillating levers, rods connecting the oscillating levers with the sections of the mold, links extending rearward from the oscillating levers, a weighted transverse bar connecting the links, and a lever fulcrumed between its ends and connected with the transverse bar and with the pumping device, substantially as described.

9. In a machine of the class described, the combination of a pumping device provided with a plunger, a treadle or foot-plate connected with the plunger, a mold composed of sections, oscillating levers connected with the sections of the mold, links extending rearward from the oscillating levers, a weighted transverse bar connecting the links, a pair of levers 26 fulcrumed between their ends and connected at their rear ends with the transverse bar, and rods or bars extending from the front ends of the levers 26 to the foot-plate or treadle, substantially as described.

10. In a machine of the class described, the combination of a pumping device provided at its top with means for discharging water, a standard or support provided at its top with a bearing, a vertically-adjustable shelf mounted on the standard or support and having a lower bearing, a mold composed of hinged sections and having its pintle arranged in the said bearings, and means for operating the pumping device and for opening and closing the mold, substantially as described.

11. In a machine of the class described, the combination of a supporting-frame having a platform, a tank located beneath the platform, a pumping device extending upward from the tank and having a plunger, a foot-plate or treadle secured to the plunger and arranged adjacent to the platform, a mold composed of sections, means for connecting the mold with the foot-plate or treadle, whereby the sections will be closed by the foot of the operator, and a weight for opening the mold, substantially as described.

12. In a machine of the class described, the combination of an upright standard provided at the top with a bearing, a shelf having a bearing and provided with arms adjustably secured to the standard, a mold having a pintle arranged in the said bearings, and means for operating the mold, substantially as described.

13. In a machine of the class described, the combination of an upright standard provided at the top with a recess, an upper bearing detachably fitted in the recess, a shelf provided with a bearing and adjustably mounted on the standard, a mold composed of sections and having a pintle arranged in the said bearings, and means for operating the mold, substantially as described.

14. In a machine of the class described, the combination of a frame provided with means for engaging an article prior to its separation from a blowpipe, whereby the same may be readily separated, and an automatically-dumping cradle located beneath to receive the article from the said means and adapted to be operated by the weight of the article to discharge the latter into a suitable receptacle, substantially as described.

15. In a machine of the class described, the combination of a frame provided with an opening to receive a blowpipe and adapted to enable the article to be readily broken from the said pipe, and a pivoted automatically-dumping cradle located beneath the said opening and arranged to receive the article, substantially as described.

16. In a machine of the class described, the combination of a frame provided with side standards and having a connecting-bar provided with an opening, said standards being also provided with bearings arranged at intervals, and an automatically-dumping cradle mounted in the said bearings and adapted to be arranged at different elevations, substantially as and for the purpose described.

17. In a machine of the class described, the combination of a frame, a tray pivotally mounted on the frame and adapted to be tilted to discharge its contents, and a pivotally-mounted cradle arranged to receive the articles as they are molded and adapted to be automatically tilted by the weight of the same to deliver the said articles into the tray, substantially as described.

18. In a machine of the class described, the combination of a frame provided with standards and having a connecting top piece, projections arranged at the outer faces of the standards, a pivoted tray supported by the projections and provided with a handle, and a cradle pivotally mounted between the standards and arranged to be automatically dumped by the weight of an article, substantially as described.

In testimony that I claim the foregoing as my own I have hereto affixed my signature in the presence of two witnesses.

J. JAKOB BURKHARDT.

Witnesses:
WILLABERY ZERBY,
HENRY SANERBREY.